P. MAST.
FENCE GATE.
APPLICATION FILED JULY 19, 1912.
1,044,214.
Patented Nov. 12, 1912.
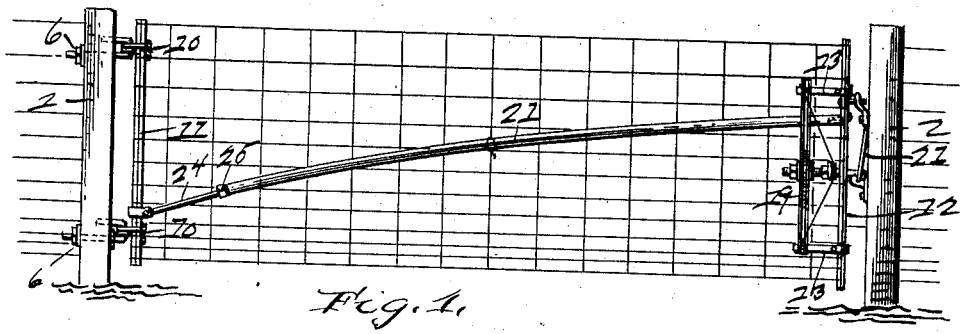
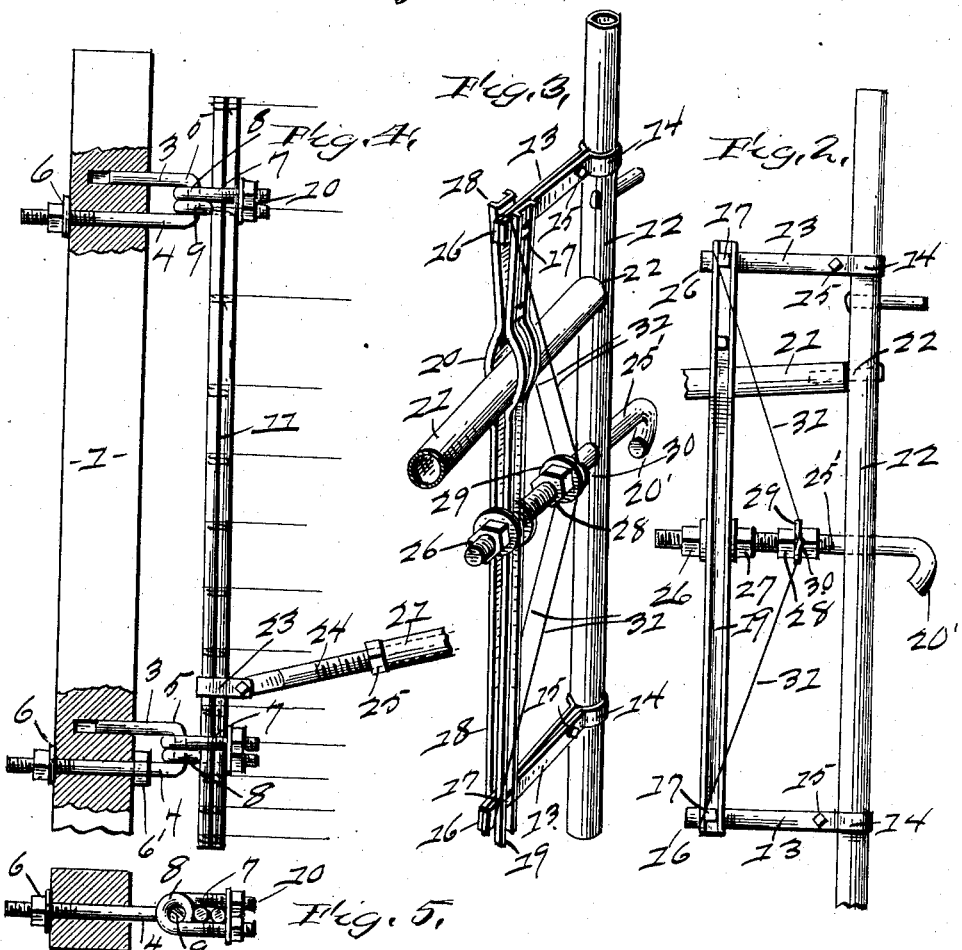

UNITED STATES PATENT OFFICE.

PETER MAST, OF TOLEDO, OHIO.

FENCE-GATE.

1,044,214.  Specification of Letters Patent.  Patented Nov. 12, 1912.

Application filed July 19, 1912. Serial No. 710,332.

*To all whom it may concern:*

Be it known that I, PETER MAST, a citizen of the United States, residing at Toledo, in the county of Lucas and State of Ohio, have invented certain new and useful Improvements in Fence-Gates; and I do hereby declare the following to be a full, clear, and exact description of the invention, such as will enable others skilled in the art to which it appertains to make and use the same.

This invention has reference to improvements in the construction of fence gates and it embodies certain novel features and the combination, arrangement and details hereinafter shown, described and claimed.

In the accompanying drawings illustrative of my invention Figure 1 is a view of a complete gate embodying my improvement; Fig. 2 is an enlarged view of the forward or locking end of the gate; Fig. 3 is a view of the same in perspective; Fig. 4 is an enlarged view of the rear or hinged end of the gate showing the means for taking up or adjusting the wire section of the gate; Fig. 5 is a plan view of the same.

Referring to the details, 1 and 2 are posts between which the gate operates, the post 1 being bored with two sets or pairs of holes, one hole of each pair being but partially bored through, to receive the parallel shanks 3 and 4 of hinge members 5. Shank 3 of each hinge member is short to be held in place in the hole which is partially bored through the post, and the shank 4 is threaded and carries a nut and washer 6 by which the member is adjusted, an additional nut 6' being carried by the lower hinge member to hold it in adjusted position. The other member 7 of each hinge is in the form of a U with an eye 8 bent around the angled end 9 of the members 5. The shanks of the members 7 are threaded and carry nuts and connecting washer plate 10. Firmly held in position between the shanks of the member 7 by the nuts and washer plate 10 are a pair of bars 11 to which the ends of the wire fabric of the gate are secured, and after the wires have been fastened to the bars 11 the wire section of the gate is effectively adjusted by merely turning the bars to wind it up, when they are again secured to the hinge members 7 and held in place by the nuts and washer plate 10. The forward or locking end of the gate comprises a front bar 12 which is preferably a gas pipe to which the forward end of the wire section of the gate is firmly secured in any suitable manner, and 13 are metal straps bent around the front bar 12 at 14 and held by bolts 15. The ends 16 of the straps 13 are secured by bolts 17 between the upper and lower ends respectively of channel bars 18 and 19 formed up with bent portions 20 to provide an opening through which a tubular spring bar 21 extends, the latter being connected with the front bar of the gate at 22, the opposite end of the spring bar being adjustably connected with the bars 11 by a clamp 23, a screw threaded stud 24 pivoted to the clamp, and a nut 25 which when operated causes the spring bar to lengthen and thereby, acting through the resiliency of the spring bar, to raise the forward end of the gate to any elevation desired, the spring bar being maintained in an upwardly curved position by securing the same at an intermediate point to the wire section of the gate.

25' is a rod disposed between the channel bars 18 and 19 and extending through the front bar 12 and terminating in a hook 20' adapted to be engaged by a pivoted cam or locking lever 21 (Fig. 1) the hook being released when the lever is thrown down, the wire section of the gate being under tension when the gate is locked. Rod 25' is threaded to receive nuts 26 and 27 adapted to clamp opposite sides of the channel bars, the rod being thereby held in place. Rod 25' also has a nut 28 thereon which engages a washer plate 29 which is free upon the rod and which has upturned margins 30. Washer plate 29 serves as a saddle for the straining wires 31 passing over the ends of the channel bars. By screwing up the nut 28 equal strain is directed upon the wires and since the front bar is rigidly connected with the ends of the channel bars by the straps 13, the constant strain upon the wires holds the front bar absolutely rigid. The front bar is thereby insured against the possibility of bending.

It is evident from the foregoing description that by straining the spring bar, the forward end of the gate will be maintained in suspended and elevated position when unlatched, and when in latched position it will form practically a continuation of the fence proper, the wire section of the gate being under tension.

What I claim, is—

In a gate, a rear vertical bar, a trussed vertically extending frame at its forward end, a section of wire fabric connecting the rear bar and the trussed frame, and an inclined tubular spring bar disposed under endwise tension between the rear bar and the trussed frame.

In testimony whereof, I hereunto affix my signature, in presence of two witnesses.

PETER MAST.

Witnesses:
 CARL H. KELLER,
 W. W. LEIGHTON.